Feb. 17, 1942.     C. J. P. HOEHN     2,273,405
DISINTEGRATOR
Filed Aug. 19, 1938     2 Sheets-Sheet 2
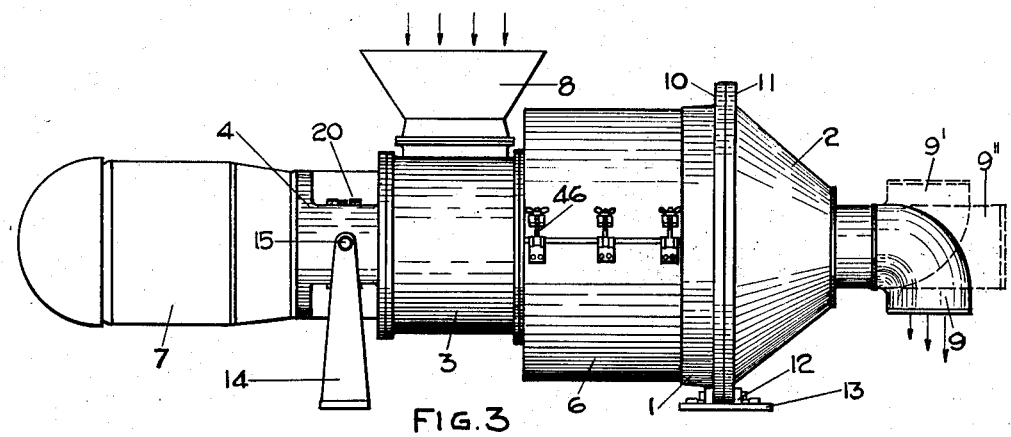
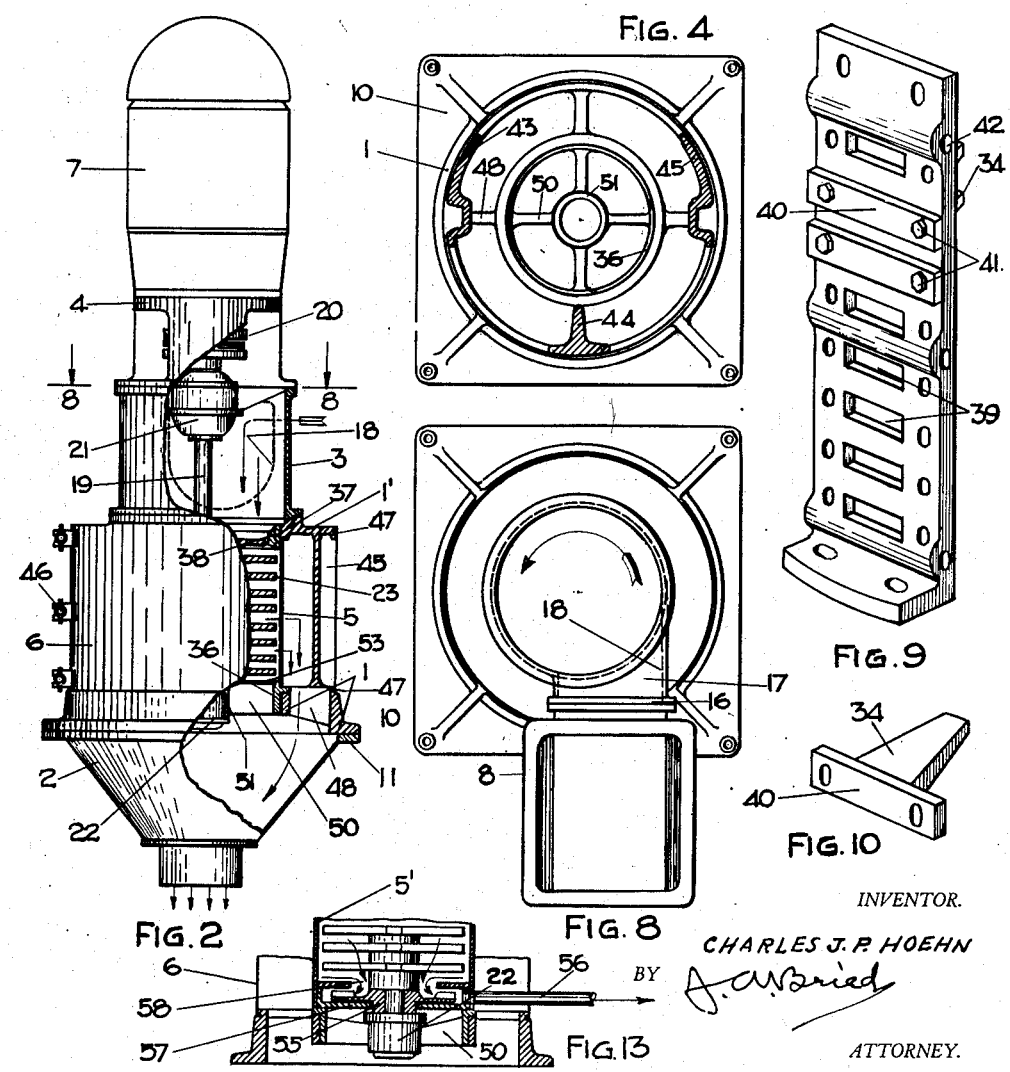
INVENTOR.
CHARLES J. P. HOEHN
BY
ATTORNEY.

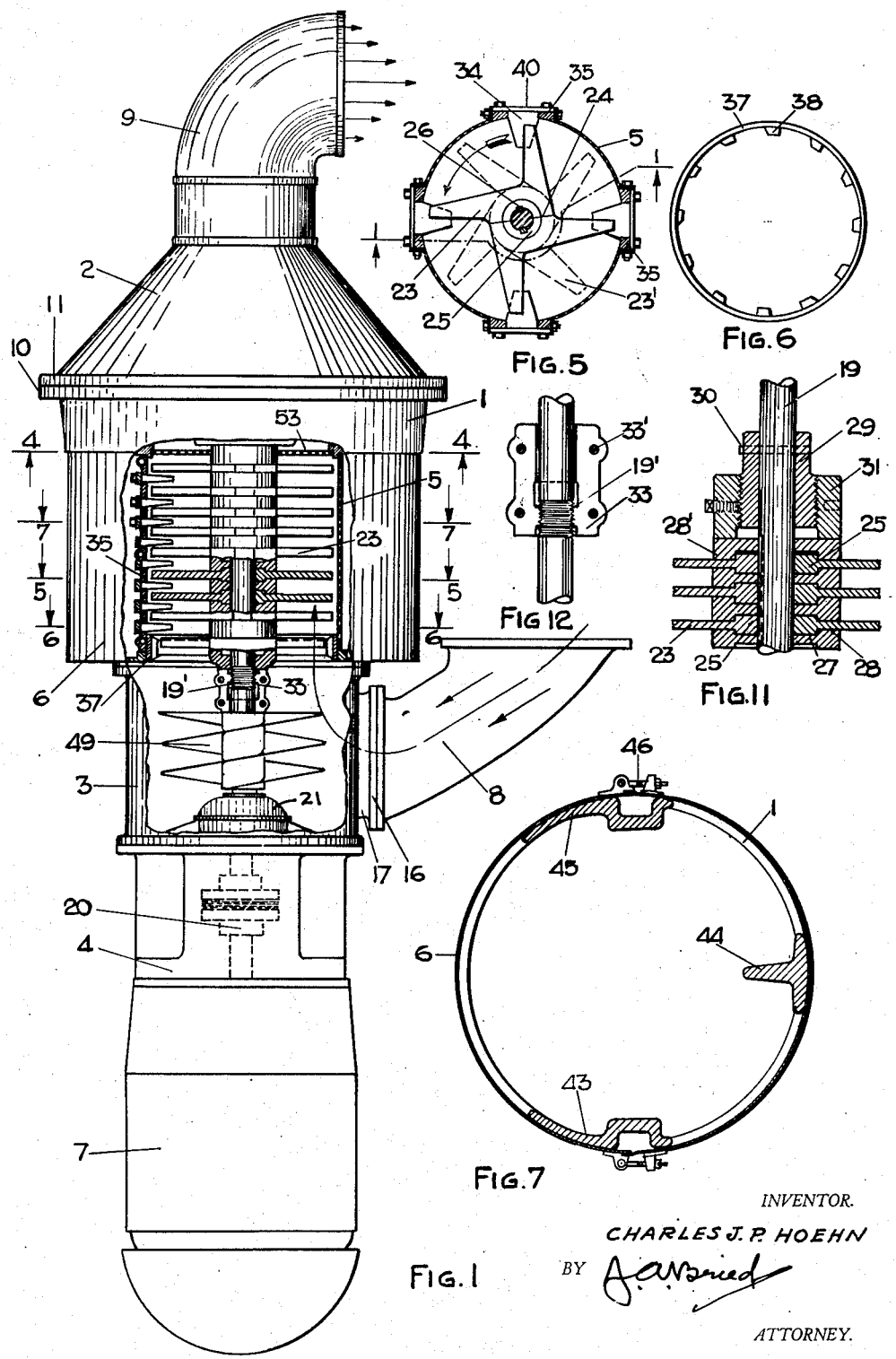

Patented Feb. 17, 1942

2,273,405

UNITED STATES PATENT OFFICE 2,273,405

DISINTEGRATOR

Charles J. P. Hoehn, San Francisco, Calif., assignor to Enterprise Foundry Corporation, San Francisco, Calif., a corporation of Nevada Application August 19, 1938, Serial No. 225,739

7 Claims. (Cl. 83—11)

This invention relates to disintegrating mills, or so-called hammer mills as used for finely disintegrating various materials such as the pureeing of fruits and vegetables, fish and meal, raw meat, green bone, spices, flour, feed sugar, chemical products, resins, cement slurries, homogenizing, pulping cannery waste disposition, fertilizers, etc., etc., and the invention has for its principal object improvements in the construction of such mills whereby they are more adaptable to various industrial applications in horizontal or vertical, down feed or up feed, installations without change of fundamental structure, and the various wearing parts of the machine are easily removed and replaced in whole or part without taking down the whole machine or removing any of its main frame or heavy units.

Other features of importance are simplicity of construction, together with high efficiency easily maintained by reason of the construction to be described in the following specification and accompanying drawings.

In the drawings:

Figure 1 is an elevation, partly in section, showing my improved disintegrator as mounted vertically with upward feed, the mill being shown partly in section to reveal the internal construction. The sectioned portion is taken from line 1—1 of Figure 5.

Figure 2 is a reduced size elevation showing the mill as mounted vertically, but arranged for down feed, part of the mill being broken away to show the flow of materials.

Figure 3 is a reduced size elevation showing the mill as mounted horizontally and arranged for receiving raw material from above, while delivering the disintegrated product either downwardly, upwardly, or horizontally.

Figure 4 is a bottom plan view of the frame of the mill as seen from the line 4—4 of Figure 1.

Figure 5 is a cross section of the rotor shown in relation to the comb teeth and cylindrical screen, all as seen generally from the line 5—5 of Figure 1.

Figure 6 is a cross section of Figure 1 as seen from the line 6—6 thereof showing the prebreaking ring.

Figure 7 is a cross section of Figure 1 as seen from the line 7—7 showing the main frame elements and outer casing only.

Figure 8 is a cross section of Figure 2 as seen from the line 8—8 showing the tangential feed inlet.

Figure 9 is an enlarged perspective view of one of the comb tooth holders, with some of the teeth in place.

Figure 10 is a perspective view of one of the comb teeth shown detached.

Figure 11 is an enlarged fragmentary section of the machine showing the rotor split hub locking arrangement.

Figure 12 is a modification of the locking arrangement.

Figure 13 shows a centrifugal ejector as used for fluid products.

Briefly described, the disintegrator comprises a frame composed of several cylindrical or annular sections 1, 2, 3, 4, with a rotor mounted in section 1, a screen 5 immediately surrounding the rotor, a spaced outer casing 6, a driving motor 7 mounted on the end of section 4, an inlet hopper 8 swively mounted on section 3, and a swively mounted discharge spout 9 on section 2, section 2 being of funnel form to converge the comminuted products into the discharge spout 9.

The various members are preferably flanged and bolted together as indicated to hold them together while permitting relative rotary adjustment, so as to provide for any possible direction of intake or output of materials, whether the mill is mounted vertically with either end up, or horizontally.

When the mill is mounted vertically for upward feed of material to the rotor, it is supported on a bolting flange 10 of main frame section 1, and when mounted with the opposite end up for downward feed of material, as indicated in Figure 2, it may be supported on the matching flange 11 of funnel section 2, the bolt holes (not shown) being drilled through both flanges to match.

When the mill is installed horizontally a foot support is provided to receive the edges of flanges 10 and 11 between bolting flanges 12, as indicated in Figure 3, and which support is provided with a floor plate 13 for bolting to the floor, while the opposite end of the mill is supported on a floor pedestal 14 secured to frame member 4 preferably by a pivotal bolt connection 15 so as to provide for tilting the mill to either a downward or upward angle toward the discharge end, as may be desired in some installations, or for best results when operating on special more or less fluid or viscous materials.

The intake hopper 8 has a circular flange connection 16 with the neck 17 of intake port 18 which enters section 3 of the mill tangentially (as best indicated in Figure 8) so as to feed the material with the direction of rotation of the mill shown by the arrow in this figure, and since the hopper swivels on its own flange connection as well as swings bodily around the mill by turning section 3 to any desired point, it will be seen to be universally adjustable about the mill to receive material either by gravity or by force feed from any direction whatever. In Figure 2 the inlet port 18 is dotted, as it would be in the front wall of this view.

The rotor of the mill is mounted on a central shaft 19 preferably connected to the motor by a flexible coupling indicated at 20, and supported in independent bearings 21, 22, the latter especially being suitably dust proofed in any well known manner.

The rotor may have any number of hammers or beater arms 23, but is shown here as made up of superimposed sections each having four arms and each section being split through its hub as at 24 in Figure 5 to form two half-sections each carrying two arms. These arms may be of any desired size, cross section, or form, but plain arms as indicated in the figures are satisfactory for most purposes, and they are formed with hubs 25, or rather half hubs projecting from both sides, and each with keyways to fit over keys in the shaft as indicated at 26.

The half hubs of the beater arms or hammers are all turned outside to the same diameter, and they are held in place on the shaft by means of cupped locking disks which have a central web 27 bored and keyseated to fit easily over the shaft and are provided with marginal flanges 28 internally bored to fit over the hubs of the hammer arms, as best indicated in Figure 11. The locking disk at the end of the assembly remote from the motor is pinned or otherwise held against movement, and both end ones are single cups as indicated for the one 28' at the motor end, and at which end provision is made for forcing the whole assemblage of hammers and locking disks tightly together. This may be carried out as shown in Figure 11 by providing a collar 29 set screwed as at 30, or otherwise rigidly secured to the shaft, and over which is a threaded collar 31 which bears at its end against the end locking cup 28' so that by application of a spanner wrench, collar 31 may be screwed along fixed collar 29 to force all the cups and half hubs into solid engagement. Alternately to the above, the shaft 19 may be threaded for a short distance as at 19' in Figure 12, and a split collar 33 provided with one end threaded to fit and the remainder plain bored for a tight fit on the shaft when split bolts 33' are tightened.

From the construction just above described, it will be apparent that upon releasing collar 31 sufficiently to move cup 28' out of engagement with the hubs of the hammers, and also to permit the hubs to be moved out of engagement with the next adjacent cup, any or all of the hammer sections may be removed laterally from the machine, or new ones put in, without removing the shaft. This is particularly important in operating on highly abrasive materials and it becomes necessary to renew or retip some of the hammers. If desired to use swing hammers, they may have their shanks pivoted to their hubs in the well known manner, yet retaining the quick removability feature above described.

The hammer arms are spaced apart by their hubs and intervening locking plates, and are preferably arranged along the shaft with the arms of each segment somewhat behind the preceding one (with reference to the feed end of the mill and direction of rotation, as indicated by the dotted position of the next set of arms 23' in Figure 5) so as to give them a spiral arrangement when all are assembled. The spacing of the arms may be varied by use of washers or thinner or thicker locking disks.

At their outer ends the hammers pass between stationary teeth or combs 34, and adjacent the cylindrical screen 5. The comb teeth 34 are here shown detachably mounted on supporting bars 35 bolted at their opposite ends respectively to flanges or rings 36, 37, suitably secured within the frame of the machine, the latter ring being formed with a series of internal projecting jaws 38 to form a pre-breaker element cooperating with the first and somewhat shorter set of hammers, to initially shatter the entering material.

Comb bars 35 are best shown in Figure 9 wherein most of the teeth 34 have been omitted to show the individual slots 39 through which the teeth are projected, and the outer flanges 40 of the teeth secured to the bars as by cap screws 41. There may be two or any number of comb bars spaced around the rotor, and the screen 5 is made in arcuate sections outwardly flanged along the edges to be bolted through holes 42 in the comb bars as indicated in Figure 5. Figure 10 shows a single comb tooth removed from bar 35.

From the preceding it will be seen that any tooth may be separately removed from a comb bar or all may be removed with the bar. Also any or all screen sections may be easily removed.

The main frame of the machine is especially made to permit the lateral removal of the internal elements, and to this end it has the central cross section shown in Figure 7, and wherein the longitudinal ribs which space the ends 1 and 1' of central frame section are indicated at 43, 44, and 45, and from which it will be noted that rib 44 is T-shape while the other two are channel shape with an arcuate flange along one of their edges, and that the free space between these two flanges is large enough to pass the entire rotor assembly if desired for removing laterally from the mill.

Around the outside of the flanges of these frame ribs is the sheet metal casing or outer shell 6 preferably formed of at least two sections clamped around the machine by wing-nut pivoted clamp bolts 46 as indicated in Figures 3 and 7. The shell sections seat at their end margins against rubber gasket rings 47 inserted in grooves formed around the outside of frame ends as indicated in Figure 2.

When the disintegrator is arranged as in Figure 2 for downward feed, it is preferably provided with a disk screen plate 53 below the lower end of the rotor for direct passage of reduced material to join the main body of reduced material being thrown out centrifugally through the cylindrical screen sections 5 to fall between the ribs 48 of frame member 1 into the conical or funnel member 2.

When the machine is reversed in position to that shown in Figure 1 for upward feed of material through the rotor, the disk screen 53 is of course just above the rotor, and in this case it is desirable in handling most materials to provide a propeller type fan or conveyor on the rotor shaft below the rotor as indicated at 49 in Figure 1 to throw the material upward into the rotor.

Such a fan is also desirable with some materials with the mill disposed more or less horizontally as shown in Figure 3, and in fact with some materials even in a down feed installation as shown in Figure 2 the lower screen plate is replaced by an imperforate plate and the lowermost set of hammers by a narrow propeller type fan set to constantly lift larger particles which may gravitate through the rotor, though generally the draft and centrifugal action set up by the high speed of the direct connected rotor (1800 to 3600 R. P. M.) keeps the mill clear of any settling or otherwise accumulated materials.

Instead of using a fan on the rotor shaft to urge the material into the rotor, it sometimes is desirable to use it for ejecting the disintegrated product away from the mill, especially such fluid materials as pureed tomatoes, as used for catsup, and which it may be desired to eject to a higher level or floor above the locations of the hammermill for further processing. In such cases the screen shell 5 is usually left imperforate as at 5' in Figure 13, and the fan, or rather centrifugal pump runner 55 is incorporated on the rotor in place of one or two of the lowermost hammers (in a down-feed mill) so that it will eject the reduced fluid material from a pipe 56 which extends tangentially from the machine. This pipe preferably screws into the casing 57 which encloses the pump runner, and the casing has a central opening 58 on top for ingress of the material. The flow of material into the casing follows the direction of the small arrows in Figure 13. The circular pump casing may be made of a size to close off the adjacent end of shell 5' against other exit for the liquid material, than through the pump. This is a valuable feature of the mill when used with some fluid materials which are intended for use at some distance from the mill as it makes a self-contained arrangement which may all be removed with the rotor as a unit. This feature will also operate on the mill when horizontally disposed.

Ring 36, which supports disk screen 53 fits within and upon member 1 as shown in Figure 2, is the outer member of a spider having inwardly extending ribs 50 joined to a central ring or open socket 51 formed to receive and support the end bearing 22 of the rotor shaft, as indicated in Figure 2. This arrangement permits the entire rotor shaft and bearing to be axially withdrawn from the machine upon releasing section 4 of the frame.

In Figure 3 the discharge nozzle is shown in full lines as delivering the finished material downwardly, but it may be turned to deliver horizontally or upward as indicated in dotted lines at 9', or be replaced with a fitting to deliver in line with the axis of the machine as indicated in dotted lines at 9".

While I have shown the hammers and comb teeth of the disintegrator all of the same length, except the first set of hammers within the pre-breaking ring, it is manifest that they may be of varying lengths, or gradually increasing or decreasing in length, as well as of various widths and thicknesses, as the nature of the material being worked on may require for best results.

The use of comb teeth between the hammer arms not only greatly increases the grinding efficiency, but materially reduces the wear on the screens as they merely act as material retainers until disintegration proceeds to the required degree for the particles to be blown through the screen instead of being rubbed or worn through.

It should also be noted that my improved hammer assembly makes a very compact arrangement permitting closer positioning of the end bearings than usually possible in a mill of this type, and reduces shaft vibration to the minimum.

With a disintegrator built in accordance with the foregoing description it is possible to meet most every requirement for this type of mill for any industrial purpose as well as any particular manner of installation, without changing the construction, and at the same time making every part quickly and easily accessible for adjustments, replacements, or the changing to various metals for the hammers, marginal teeth, screens, or other operating parts contacting the material being operated upon.

Having thus described my improvement in disintegrator construction, what I claim is:

1. In a disintegrator of the character described, a rotor including a shaft having a series of substantially radially disposed hammers extending therefrom, a screen surrounding said rotor, a casing surrounding the screen, means for feeding material to one end of the rotor, a breaker ring surrounding the hammers adjacent the feed end of the rotor only provided with a series of inwardly projecting jaws for pre-breaking the entering material, and normally fixed comb teeth interleaved between the outer ends of the remaining hammers.

2. In a hammermill of the character described, a shaft with a rotor mounted thereon carrying substantially radially disposed hammers, said rotor comprising a plurality of split hammer sections each provided with half-hubs of greater thickness than the hammer sections, and means interposed between the hubs of adjacent hammer sections each locking a pair of confronting half-hubs together, and means at the ends of the rotor clamping the assemblage in locked relation.

3. In a hammermill of the character described, a shaft with a rotor mounted thereon carrying substantially radially disposed hammers, said rotor comprising a plurality of hammer sections each provided with split half-hubs of greater thickness than the hammer sections engaging the shaft, and solid cup-like members on said shaft interposed between the split hubs of adjacent hammer sections each engaging over the ends of a pair of confronting half-hubs and locking them together, and releasable means at the ends of the rotor clamping the assemblage in locked relation, all whereby upon releasing said releasable means the cups and hubs may be moved relatively axially of the shaft and the hammer sections with their half-hubs removed laterally from the shaft.

4. In a structure as set out in claim 2 said means at the ends of the rotor clamping the assemblage together comprising an abutment at one end of the assemblage and a threaded collar at the opposite end arranged for forcing the loose members toward the abutment.

5. In a disintegrator of the character described, a frame, a rotor mounted in the frame carrying substantially radially disposed hammer arms, comb teeth between which said hammer arms pass during operation of the rotor, supporting bars positioned at spaced points about the rotor and to which said comb teeth are secured, each bar formed with spaced transverse slots through which the comb teeth respectively project, and the comb teeth formed with flanges on their outer ends individually bolted to said bar so as to be separately outwardly removable from the bar.

6. In a disintegrator of the character described, a frame, a rotor mounted in the frame carrying substantially radially disposed hammer arms, comb teeth between which said hammer arms pass during operation of the rotor, supporting bars positioned at spaced points about the rotor and to which said comb teeth are secured, and arcuate screen sections enclosing said rotor secured at their margins to said bars in a manner for direct outward removal from said bars and rotor.

7. In a disintegrator of the character described, a rotor comprising a vertical central shaft with a group of substantially radially extending hammer arms mounted thereon, a cylindrical shell adjacent and surrounding the rotor, bearings rotatably supporting said rotor within said shell and spaced beyond the ends of the group of hammers, a centrifugal runner secured to said shaft between one end of the group of hammers and one of the bearings and a circular casing in which said runner operates positioned within and closing the lower end of the shell, the upper wall of said casing forming a shield member adjacent said runner providing for inflow of fluid materials to the runner from within said shell only, adjacent the shaft directly from said shell, and a tangential outlet pipe from said casing extending through the shell wall.

CHARLES J. P. HOEHN.